(12) United States Patent
Yoshikawa

(10) Patent No.: US 11,906,440 B2
(45) Date of Patent: Feb. 20, 2024

(54) INSPECTION DEVICE AND INSPECTION METHOD

(71) Applicant: KIOXIA CORPORATION, Tokyo (JP)

(72) Inventor: Ryoji Yoshikawa, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 45 days.

(21) Appl. No.: 17/684,123

(22) Filed: Mar. 1, 2022

(65) Prior Publication Data

US 2023/0100104 A1 Mar. 30, 2023

(30) Foreign Application Priority Data

Sep. 15, 2021 (JP) ................ 2021-150452

(51) Int. Cl.
  *G01N 21/88* (2006.01)
  *G01N 21/95* (2006.01)

(52) U.S. Cl.
  CPC ..... *G01N 21/8806* (2013.01); *G01N 21/9501* (2013.01); *G01N 2021/8887* (2013.01)

(58) Field of Classification Search
  CPC ........... G01N 21/8806; G01N 21/9501; G01N 2021/8887
  See application file for complete search history.

(56) References Cited

U.S. PATENT DOCUMENTS

| | | | |
|---|---|---|---|
| 7,521,676 B2 | 4/2009 | Okuda et al. | |
| 7,547,884 B2 | 6/2009 | Hasegawa et al. | |
| 8,368,018 B2 * | 2/2013 | Hatakeyama | H01J 37/26 250/306 |
| 9,640,366 B2 | 5/2017 | Yokosuka | |
| 2002/0028399 A1 | 3/2002 | Nakasuji | |
| 2007/0194229 A1 | 8/2007 | Okuda et al. | |
| 2009/0242787 A1 | 10/2009 | Nakayamada | |
| 2015/0241369 A1 * | 8/2015 | Nagano | H01J 37/265 250/310 |
| 2016/0181062 A1 | 6/2016 | Kato et al. | |

(Continued)

FOREIGN PATENT DOCUMENTS

| | | |
|---|---|---|
| JP | 2007157575 A | 6/2007 |
| JP | 2009027190 A | 2/2009 |
| JP | 4675853 B2 | 4/2011 |

(Continued)

*Primary Examiner* — Hung V Nguyen

(74) *Attorney, Agent, or Firm* — Kim & Stewart LLP

(57) ABSTRACT

An inspection device includes control unit that acquires pre-charging irradiation amounts for inspection areas on an inspection target. The pre-charging irradiation amounts are based on pattern information for each of the inspection areas. An irradiation unit is provided to control a plurality of first beams to supply the pre-charging irradiation amounts to each of the inspection areas using a corresponding one of the plurality of first beams. After supplying the respective pre-charging irradiation amount to at least one of the inspection areas, irradiation unit controls one of a plurality of second beams to irradiate a pre-charged one of the inspection areas. A generation unit generates images of each of the plurality of inspection areas based on the respective irradiation of the inspection areas with the second beams.

20 Claims, 8 Drawing Sheets

(56) References Cited

U.S. PATENT DOCUMENTS

2019/0043691 A1    2/2019   Zhang

FOREIGN PATENT DOCUMENTS

| JP | 4790324 B2 | 10/2011 |
| JP | 4914604 B2 | 4/2012 |
| JP | 2016119423 A | 6/2016 |
| JP | 2020174018 A | 10/2020 |
| TW | 200603196 A | 1/2006 |
| TW | 201003710 A | 1/2010 |
| TW | I687680 B | 3/2020 |

* cited by examiner

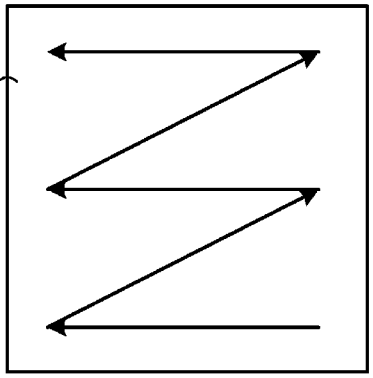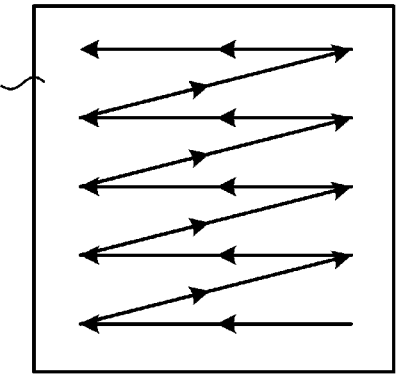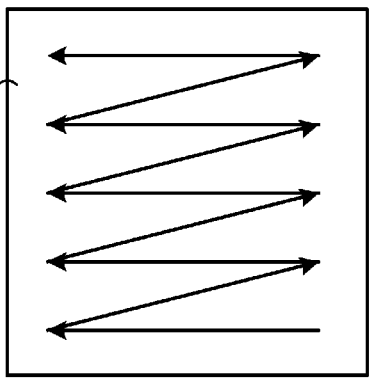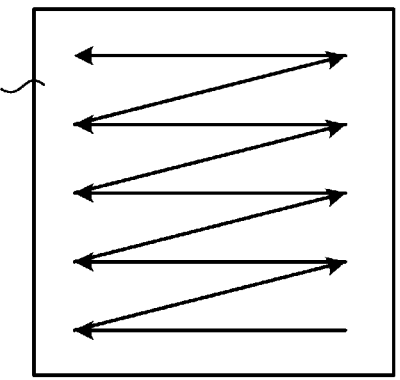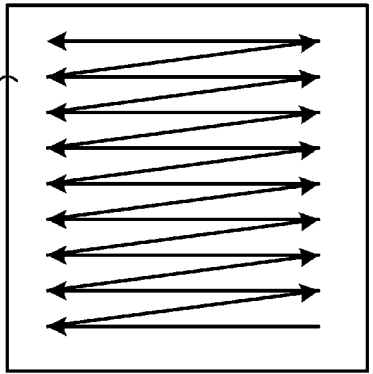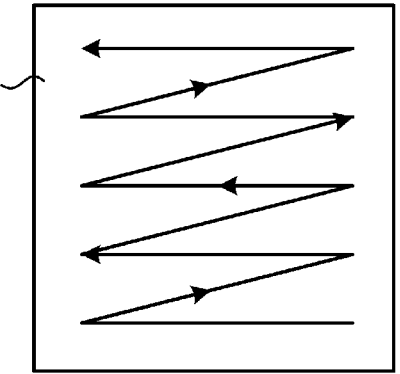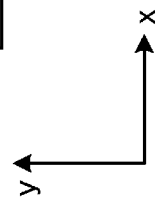

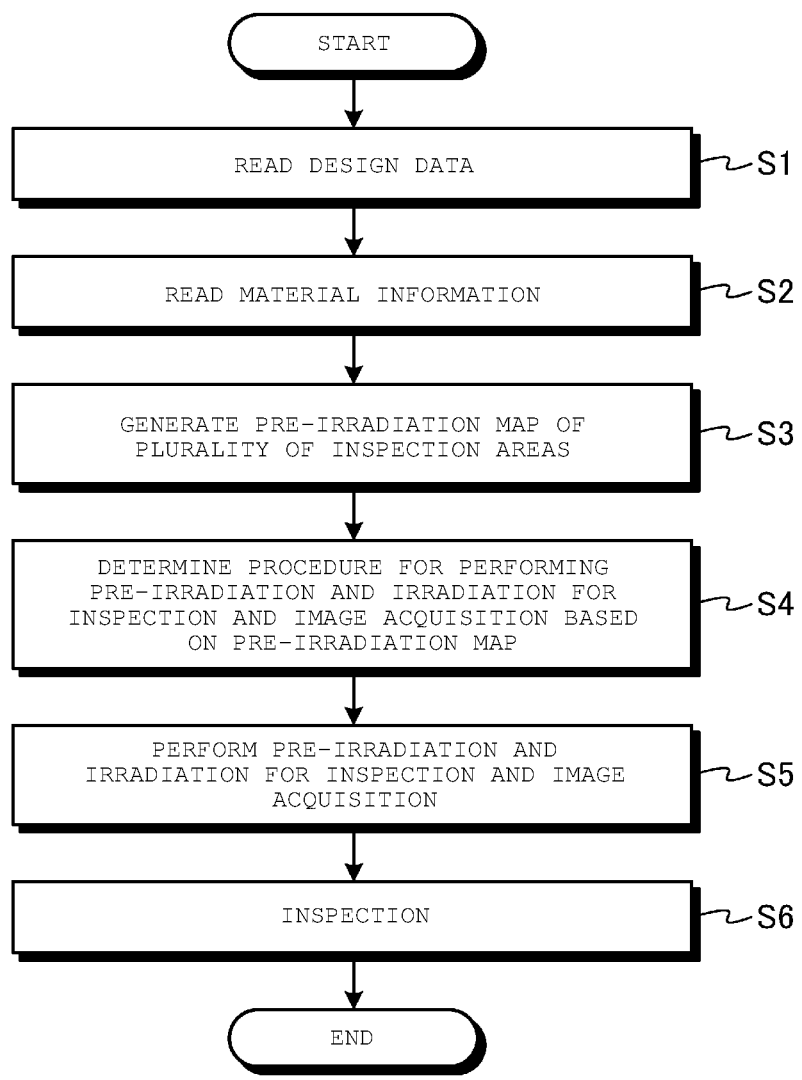

INSPECTION DEVICE AND INSPECTION METHOD

CROSS-REFERENCE TO RELATED APPLICATION

This application is based upon and claims the benefit of priority from Japanese Patent Application No. 2021-150452, filed Sep. 15, 2021, the entire contents of which are incorporated herein by reference.

FIELD

Embodiments described herein relate generally to an inspection device and an inspection method related to semiconductor device manufacturing or the like.

BACKGROUND

With an inspection device, such as an electron microscope, a predetermined inspection can be performed by irradiating an inspection object with a charged particle beam and generating an image of the inspection object. However, it is generally desired to improve the accuracy of such inspections.

BRIEF DESCRIPTION OF THE DRAWINGS

FIGS. 4A to 4F are diagrams illustrating an adjustment operation of an irradiation amount according to the embodiment.

FIG. 7 is a flowchart illustrating the operation of the inspection device according to the embodiment.

DETAILED DESCRIPTION

Embodiments provide an inspection device and an inspection method capable of providing enhanced accuracy in an inspection.

In general, according to one embodiment, an inspection device includes a control unit configured to acquire pre-charging irradiation amounts for a plurality of inspection areas on an inspection target. The pre-charging irradiation amounts are based on pattern information for each of the plurality of inspection areas. An irradiation unit is provided to control a plurality of first beams to supply the pre-charging irradiation amounts for each of the plurality of inspection areas using a corresponding one of the plurality of first beams, respectively. After supplying the respective pre-charging irradiation amount to at least one of the plurality of inspection areas, the irradiation control unit irradiates the at least one of the plurality of inspection areas with one of a plurality of second beams. A generation unit is configured to generate images of each of the plurality of inspection areas based on the irradiation of the plurality of inspection areas with the plurality of second beams.

Hereinafter, an inspection device according to an embodiment is specifically described with reference to the accompanying drawings. In addition, the present disclosure is not limited by the embodiment.

Embodiment

Figure 1:
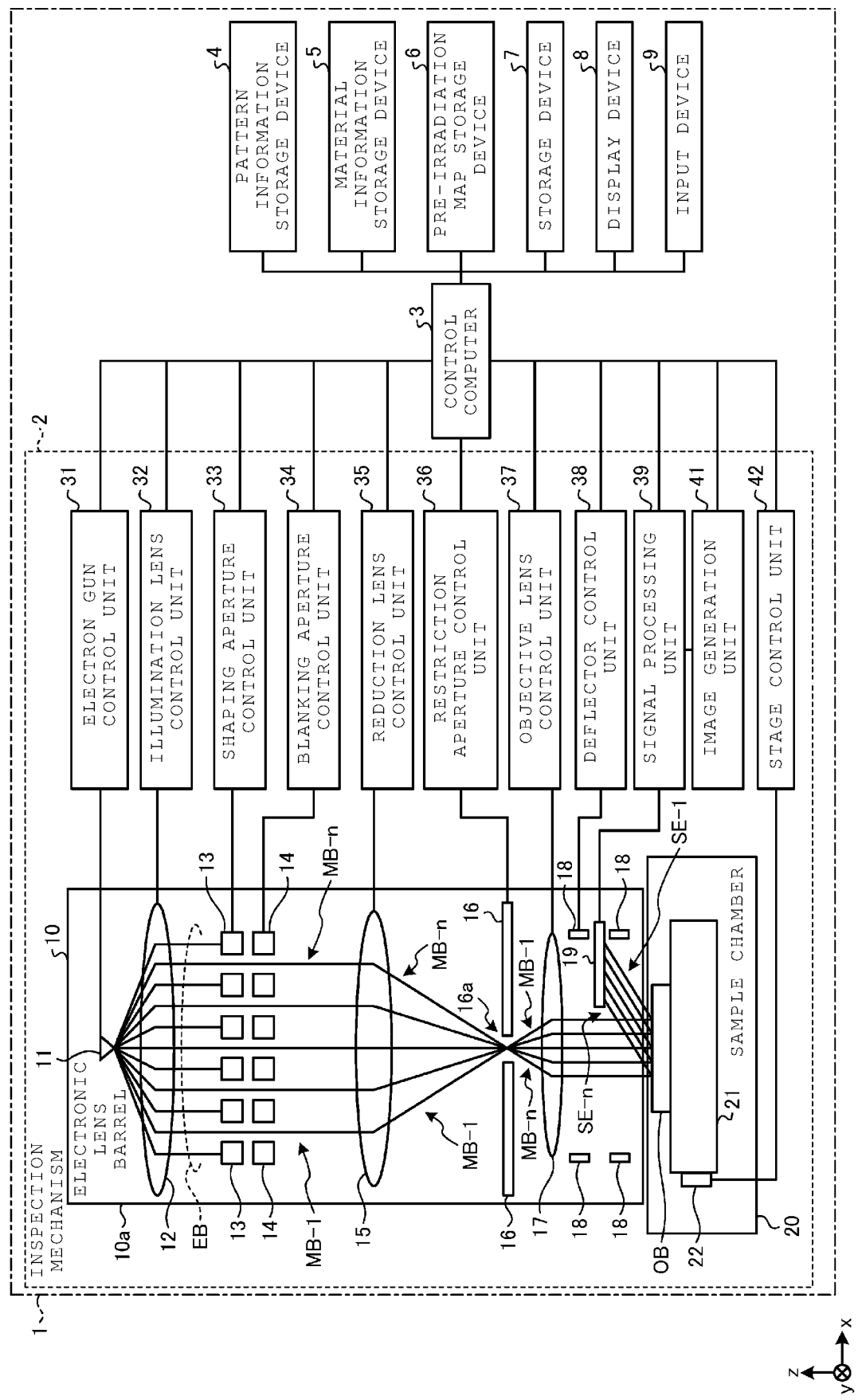
FIG. 1 depicts a configuration of an inspection device according to an embodiment.

An inspection device 1 according to one embodiment is a multi-beam-type inspection device and is configured as illustrated in FIG. 1. In the following, a vertical direction is defined as an x direction, and the two directions orthogonal to each other in a plane perpendicular to a z direction are defined as the x direction and a y direction.

The inspection device 1 divides a charged particle beam EB into a plurality of divided charged particle beams, referred to subsequently as multi-beams MB-1 to MB-n, where n is an integer of two or more. The inspection device 1 then respectively irradiates one of a plurality of inspection areas of an inspection object OB with the one of the multi-beams (beams MB-1 to MB-n). The inspection device 1 thus acquires images from the plurality of inspection areas and then performs a predetermined inspection of the inspection object OB on the basis of the acquired images. The inspection object OB may be an original plate (template or photomask) for nanoimprint or photolithography. Alternatively, the inspection object OB may be a device substrate (e.g., a semiconductor wafer or portion thereof) on which a circuit pattern or other structure has been formed. An original plate for nanoimprint is also referred to as a template, and an original plate for photolithography is also referred to as a photomask. In this context, the predetermined inspection of the inspection object OB may detect whether there is a physical defect in the inspection object OB or may be an inspection as to whether a pattern dimension or the like that has been formed on the inspection object OB is within an appropriate range.

The inspection device 1 preliminarily irradiates the inspection object OB prior to the irradiation with the beams MB-1 to MB-n for inspection.

The inspection device 1 in this example acquires pattern information corresponding to the plurality of inspection areas on the inspection object OB. The inspection device 1 calculates or otherwise obtains a preliminary irradiation amount for each of the plurality of inspection areas based on the corresponding pattern information. Each inspection area may have a different preliminary irradiation amount set according to the pattern information thereof. The preliminary irradiation amounts are set so that charging levels will be equal across the plurality of inspection areas. The inspection device 1 preliminarily irradiates (pre-charges) the inspection areas using the corresponding one of the beams MB-1 to MB-n. After the preliminary irradiation of an inspection area, the inspection device 1 irradiates the inspection area for purposes of inspection (e.g., image generation) using the corresponding one of the plurality of beams MB-1 to MB-n for the inspection area. In the inspection (the inspection irradiation), the plurality of beams MB-1 to MB-n may supply an equal irradiation amount to each of the inspection areas.

Therefore, primary electrons can be generated by the beam irradiation for inspection in a state in which emission rates of secondary electrons relative to primary electrons in the plurality of inspection areas are caused to be equal by preliminary beam irradiation. Since the emission rate of the secondary electrons during inspection can more appropriately reflect the front surface state of the inspection object OB, fluctuations in the brightness or the contrast between each inspection image (from each inspection area) can be prevented, and the inspection accuracy across the inspection object OB can be improved for the inspection device 1.

Specifically, the inspection device 1 of this embodiment includes an inspection mechanism 2, a control computer 3, a pattern information storage device 4, a material information storage device 5, a pre-irradiation map storage device 6, a storage device 7, a display device 8, and an input device 9. The control computer 3 is connected to the inspection mechanism 2, the pattern information storage device 4, the inspection object OB, the material information storage device 5, the pre-irradiation map storage device 6, the storage device 7, the display device 8, and the input device 9.

The inspection mechanism 2 includes an electronic lens barrel 10, a sample chamber 20, an electron gun control unit 31, an illumination lens control unit 32, a shaping aperture control unit 33, a blanking aperture control unit 34, a reduction lens control unit 35, a restriction aperture control unit 36, an objective lens control unit 37, a deflector control unit 38, a signal processing unit 39, an image generation unit 41, and a stage control unit 42. The electronic lens barrel 10 and the sample chamber 20 are configured so that the beams MB-1 to MB-n can be transmitted into the sample chamber 20, and secondary beams SE-1 to SE-n generated in the inspection object OB or the like by interaction with the beams MB-1 to MB-n can also be emitted out of the sample chamber 20 to be possibly received by a detector 19.

The electronic lens barrel 10 includes an electron gun 11, an illumination lens 12, a shaping aperture 13, a blanking aperture 14, a reduction lens 15, a restriction aperture 16, an objective lens 17, a deflector 18, and a detector 19. The electron gun 11, the illumination lens 12, the shaping aperture 13, the blanking aperture 14, the reduction lens 15, the restriction aperture 16, the objective lens 17, the deflector 18, and the detector 19 are provided in a lens barrel wall 10a. The inside of the lens barrel wall 10a is configured such that the inside thereof can be evacuated of air/atmosphere by a vacuum device or the like.

The sample chamber 20 includes a stage 21 and a drive mechanism 22. The stage 21 is a plate-shaped member extending in an XY direction, and the inspection object OB is placed on the surface on a +z side of the stage 21. The drive mechanism 22 can move the stage 21 in the X direction, the Y direction, the Z direction, rotate about the X axis, rotate about the Y axis, and/or rotate about the Z axis. The X direction, the Y direction, and the Z direction relating to the driving of the stage 21 correspond to the x direction, the y direction, and the z direction defined above.

The control computer 3 is connected to the electron gun control unit 31, the illumination lens control unit 32, the shaping aperture control unit 33, the blanking aperture control unit 34, the reduction lens control unit 35, the restriction aperture control unit 36, the objective lens control unit 37, the deflector control unit 38, the signal processing unit 39, the image generation unit 41, and the stage control unit 42. The control computer 3 generates various control signals and transmits the control signals to the electron gun control unit 31, the illumination lens control unit 32, the shaping aperture control unit 33, the blanking aperture control unit 34, the reduction lens control unit 35, the restriction aperture control unit 36, the objective lens control unit 37, the deflector control unit 38, the signal processing unit 39, the image generation unit 41, and the stage control unit 42.

The stage control unit 42 is connected to the drive mechanism 22 in the sample chamber 20. The inspection object OB is placed on the surface of the stage 21 on the +z side. The stage control unit 42 controls the drive mechanism 22 and moves the stage 21 so that the plurality of inspection areas in the inspection object OB correspond to the irradiation locations of the plurality of beams MB-1 to MB-n.

The electron gun control unit 31 controls an operation of the electron gun 11 to emit the charged particle beam EB from the electron gun 11 or stop the emission of the charged particle beam EB. The electron gun 11 is connected to a high-voltage power supply circuit. The electron gun control unit 31 is connected to the high-voltage power supply circuit. The high-voltage power supply circuit applies an acceleration voltage and a predetermined bias voltage between a cathode and an anode in the electron gun 11 under the control of the electron gun control unit 31. The electron gun 11 generates and emits the charged particle beam EB by accelerating a group of electrons emitted from the cathode by applying a predetermined bias voltage by the high-voltage power supply circuit and heating the cathode at a predetermined temperature. The charged particle beam EB is, for example, an electron beam.

The illumination lens 12, the shaping aperture 13, the blanking aperture 14, the reduction lens 15, the restriction aperture 16, the objective lens 17, the deflector 18, the inspection object OB (when present), and the stage 21 are sequentially located along the optical axis of the principal ray of the charged particle beam EB. The detector 19 is disposed at the location shifted from the optical axis of the principal ray near the deflector 18.

The illumination lens control unit 32 is connected to the illumination lens 12 in the lens barrel wall 10a. The illumination lens control unit 32 controls the illumination lens 12 and adjusts the z location of the illumination lens 12 so that the charged particle beam EB received from the electron gun 11 by the illumination lens 12 is, for example, collimated and guided to the shaping aperture 13. The illumination lens 12 change the direction of the charged particle beam EB to be substantially perpendicular to the shaping aperture 13 to illuminate the entire shaping aperture 13 with the charged particle beam EB.

The shaping aperture control unit 33 is connected to the shaping aperture 13. The shaping aperture 13 has a structure in which a plurality of rectangular holes are formed. The shaping aperture control unit 33 controls the shaping aperture 13 and causes the charged particle beam EB to be shaped into a multi-beam by the shaping aperture 13. That is, the charged particle beam EB is divided into the plurality of beams MB-1 to MB-n by passing through the plurality of rectangular holes in the shaping aperture 13. Each beam MB-1 to MB-n is, for example, an electron beam. The plurality of beams MB-1 to MB-n is also referred to collectively as a multi-beam in some instances.

The blanking aperture control unit 34 is connected to the blanking aperture 14. The blanking aperture 14 individually deflects each beam of the multi-beam formed by the shaping aperture. The blanking aperture control unit 34 controls the blanking aperture 14 and deflects the optical axis of each beam of the multi-beam, so that the plurality of beams MB-1 to MB-n can be scanned respectively within the plurality of inspection areas.

The reduction lens control unit 35 is connected to the reduction lens 15. The reduction lens 15 reduces the beams MB-1 to MB-n passing through the blanking aperture 14 and changes the direction of each of the beams MB-1 to MB-n so as to head toward the center of the restriction aperture 16. The reduction lens control unit 35 controls the reduction lens 15 and adjusts the z location of the reduction lens 15 so that the plurality of beams MB-1 to MB-n are refracted by the reduction lens 15 and collected near the opening of the restriction aperture 16.

The restriction aperture control unit 36 is connected to the restriction aperture 16. The restriction aperture control unit 36 controls the restriction aperture 16 and adjusts the xy location of the restriction aperture 16 so that a hole 16a of the restriction aperture 16 is located near the focusing point of the plurality of beams MB-1 to MB-n. The restriction aperture 16 blocks the beams MB deflected by the blanking aperture 14. The beams MB that are not deflected by the blanking aperture 14 pass through the hole 16a in the center of the restriction aperture 16.

The objective lens control unit 37 is connected to the objective lens 17. The objective lens control unit 37 controls the objective lens 17 and adjusts the z location of the objective lens 17 to refract and guide the plurality of beams MB-1 to MB-n by the objective lens 17 onto the inspection object OB. The objective lens 17 adjusts the focus of each beam MB that passes through the hole in the center of the restriction aperture 16 to the front surface of the inspection object OB. The plurality of inspection areas in the inspection object OB are respectively irradiated with the plurality of beams MB-1 to MB-n.

The deflector control unit 38 is connected to the deflector 18. The deflector control unit 38 controls the deflector 18. The deflector 18 deflects the secondary electrons generated in the inspection object OB, and helps to guide the secondary electrons towards the detector 19. The secondary beams SE-1 to SE-n generated in the respective inspection areas by the incident beams MB-1 to MB-n thereon.

The signal processing unit 39 is connected to the detector 19. The detector 19 detects the secondary electrons from the plurality of inspection areas and transmits detection signals for each of the plurality of inspection areas to the signal processing unit 39. The signal processing unit 39 processes the detection signals from the plurality of inspection areas and generates image signals for the plurality of inspection areas.

The image generation unit 41 is connected to the signal processing unit 39. The image generation unit 41 receives the image signals from the signal processing unit 39 and generates image data in accordance with the image signals. The image generation unit 41 supplies the image data to the control computer 3. The image data provides an image (inspection image) of a pattern formed on the front surface of the inspection object OB. The inspection image can be displayed on the display device 8 via the control computer 3 and may also be stored in the storage device 7.

The input device 9 is an interface for inputting information such as design data, the characteristics of the material of the inspection object OB, the beam condition, the coordinate location of the inspection areas, and various threshold values for inspection (inspection parameters) to the control computer 3.

The storage device 7 stores the information such as the beam condition, the coordinate location of the inspection areas, and various threshold values for inspection that are input via the input device 9. The storage device 7 also stores inspection results together with the inspection image from the inspection object OB.

The pattern information storage device 4 stores the information such as design data, drawing data, and parameters related to the structure and the material of the inspection object OB. The pattern information storage device 4 stores the pattern information corresponding to the plurality of inspection areas that is generated based on the design data.

The material information storage device 5 stores information (material information) relating to the characteristics of the material(s) of which the inspection object OB is formed. When the inspection object OB is an original plate for nanoimprint or photolithography, the inspection object OB may be a translucent insulating material such as glass or quartz. When the inspection object OB is a device substrate, the material from which the inspection object is formed may be a semiconductor material such as silicon.

The pre-irradiation map storage device 6 stores a pre-irradiation map for each irradiation area RR. The pre-irradiation map maps the irradiation amounts to be used in the preliminary charging of the plurality of inspection areas in an irradiation area RR. The pre-irradiation map storage device 6 may store the information obtained by associating the pre-irradiation map with the location information of the irradiation areas RR. The pre-irradiation map shows the distribution of irradiation amounts of the plurality of beams (multi-beams) corresponding to the plurality of inspection areas.

Figure 2:
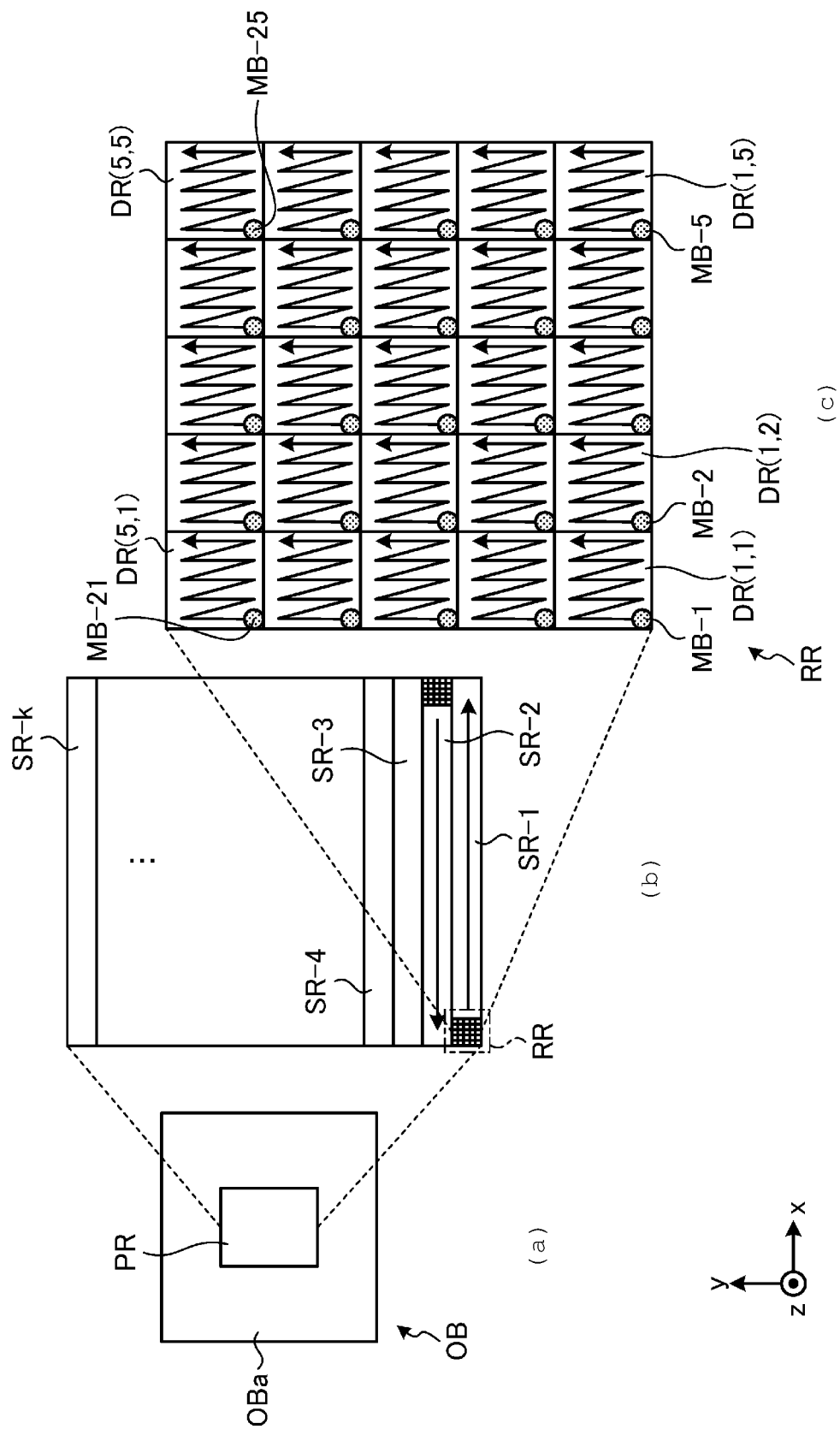
FIG. 2 are diagrams illustrating a plurality of beams and a plurality of inspection areas according to the embodiment.

The plurality of inspection areas in the inspection object OB are described with reference to FIG. 2. FIG. 2 illustrates the plurality of beams and the plurality of inspection areas.

Part (a) of FIG. 2 is a plan view illustrating an example of a pattern area PR in which a pattern is formed in the inspection object OB. The inspection object OB may have a rectangular shape or may have a circular shape in an xy plan view. In FIG. 2, a case where the inspection object OB has a rectangular shape is illustrated as one example.

The pattern area PR is an area included on a front surface OBa of the inspection object OB in the xy plan view. The pattern area PR may have a rectangular shape or may have a circular shape. When the inspection object OB is an original plate (an imprint template) for nanoimprint, the pattern area PR may be an area on the front surface OBa rising in a pedestal or mesa shape.

Part (b) of FIG. 2 is an enlarged plan view of the pattern area PR.

In the enlarged plan view, it can be seen that pattern area PR includes a plurality of inspection stripe areas SR-1 to SR-k (where k is any integer of 2 or more). The plurality of inspection stripe areas SR-1 to SR-k are obtained by dividing the pattern area PR into a plurality of stripe shaped regions, for example, each region having a width matching the width of irradiation area RR in the y direction. The irradiation area RR represent the areas that can be irradiated by the multi-beam (that is, the plurality of beams MB-1 to MB-n) at one time (or substantially so). Each of the inspection stripe areas SR extends lengthwise in the x direction. When the pattern area PR has a rectangular shape in the xy plan view, the length of each inspection stripe area SR in the x direction may be equal to one another.

The size of irradiation area RR is set by (an x direction size obtained by multiplying the number of beams along the x direction by a pitch between beams of the multi-beam in the x direction at the surface of the inspection object OB)×(a y direction size obtained by multiplying the number of beams along the y direction by a pitch between beams of the multi-beam in the y direction at the surface of the inspection object OB). In the example of FIG. 2, the width (the y direction size) of the inspection stripe area SR is the same size as the y direction size of the irradiation area RR. However, the embodiments are not limited thereto.

For example, the width (the y direction size) of the inspection stripe area may be larger than the y direction size of the irradiation area RR. Alternatively, the width (the y direction size) of the inspection stripe area SR may be preferably a natural number multiple of the y direction size of the irradiation area RR.

According to the present embodiment, the inspection device 1 scans (performs a scan operation on) the irradiation area RR in the x direction for each inspection stripe area SR to acquire an image on an irradiation area RR by irradiation area RR basis.

As seen in part (c) of FIG. 2, each irradiation area RR includes a plurality of inspection areas DR(1,1) to DR(5,5), for example. The inspection areas DR are obtained by dividing the irradiation area RR into a plurality of areas and may be referred to as a sub-irradiation area. FIG. 2 illustrates the plurality of inspection areas DR(1,1) to DR(5,5) in one irradiation area RR. The plurality of inspection areas DR(1, 1) to DR(5,5) may be located in an xy direction in the irradiation area RR. FIG. 2 illustrates a case where the multi-beam includes 25 beams MB-1 to MB-25 and is a multi-beam of 5 rows×5 columns in size.

As illustrated in FIG. 2, the individual beams MB that form the multi-beam are responsible for scanning different inspection areas DR and scan the same relative positions within each of the different irradiation areas RR. The circle element in each region DR indicates one beam BM of the beam group that forms the multi-beam.

In each inspection area DR, raster scanning is performed with the respective beam BM. In the inspection area DR, when the beam BM is irradiated from the location on an −x side and a −y side and in a +y direction and reaches to a +y side end of the inspection area DR, the beam BM is shifted to a +x direction and deflected to the −y side end of the inspection area DR. Subsequently, the beam BM is irradiated in the +y direction.

The inspection device 1 repeats the above operation and sequentially irradiates the inside of one inspection area DR with one beam BM.

The inspection device 1 illustrated in FIG. 1 preliminarily irradiates the inspection object OB prior to the irradiation with the plurality of beams MB-1 to MB-n for inspection. For example, the inspection device 1 acquires the design data for the irradiation area RR. The design data of the irradiation area RR may be design data as illustrated in FIG. 3A.

Figures 3A, 3B:
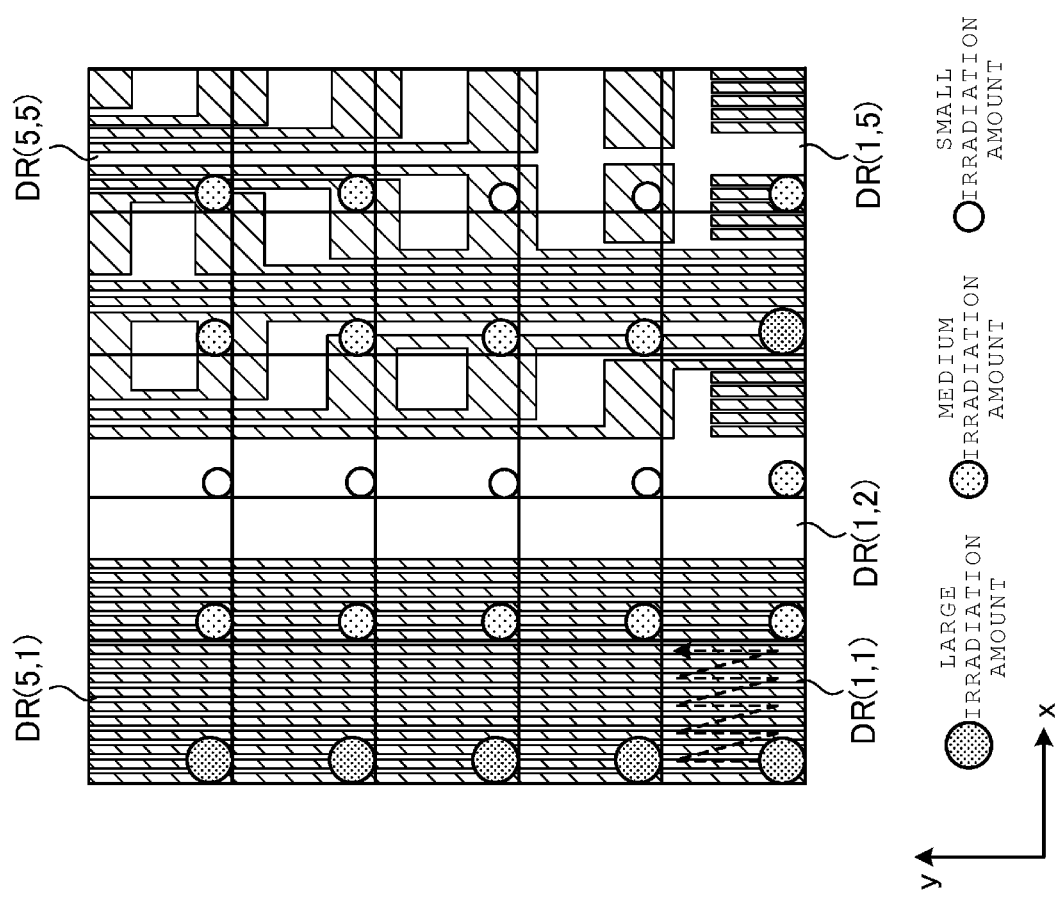
FIGS. 3A and 3B are diagrams illustrating pattern information and irradiation amounts of the plurality of inspection areas according to the embodiment.

FIG. 3A illustrates the design data of the irradiation area RR. The design data includes a pattern formed in or on the inspection object OB. When the inspection object OB is an original plate for nanoimprint, the pattern is formed as differences in height within in the pattern area PR. That is, the upper surface of the inspection object OB is uneven with respect to placement of pattern features or the like. When the inspection object OB is a circuit device substrate or the like, the pattern may be formed as a wiring pattern (e.g., different materials) and/or patterns of grooves, trenches, or holes in the pattern area PR.

The inspection device 1 obtains pattern information of the plurality of inspection areas DR(1,1) to DR(5,5) based on the design data of the irradiation area RR. The inspection device 1 obtains or calculates preliminary irradiation amounts respectively corresponding to the plurality of inspection areas DR(1,1) to DR(5,5) based on the obtained pattern information of the plurality of inspection areas DR(1,1) to DR(5,5). The inspection device 1 obtains these preliminary irradiation amounts (pre-irradiation amounts) so that the charge amounts of the plurality of inspection areas DR(1,1) to DR(5,5) are equal as illustrated in FIG. 3B.

FIG. 3B is a diagram illustrating the plurality of inspection areas DR(1,1) to DR(5,5) and design data thereof in an overlapping manner. In FIG. 3B, the pre-irradiation amount of each inspection area DR is indicated by a relative size of a circle and a degree of shading of the circle. The larger the size of a circle, the larger pre-irradiation amount. The smaller the size of a circle, the smaller the pre-irradiation amount. The darker the shading of the circle, the larger pre-irradiation amount, and the lighter the shading of the circle, the smaller pre-irradiation amount.

For example, when the inspection object OB is an original plate for nanoimprint, charges are accumulated, due to irradiation with beams during the inspection, on a substrate which is glass, quartz, or the like typically used for the original plate, and thus brightness or contrast of the inspection image are changed. Also, the charging status changes depending on the material of the inspection object OB, the size of the pattern features, the coverage of the pattern, the distance between the pattern features, and the like.

Here, the inspection device 1 divides the design data of the irradiation areas RR illustrated in FIG. 3A into the design data for the plurality of inspection areas DR(1,1) to DR(5,5) as illustrated in FIG. 3B. The inspection device 1 obtains pattern information per design data of the inspection area DR after the division, determines a preliminary irradiation amount (pre-irradiation amount) according to the pattern information, and stores the preliminary irradiation amount in the pattern information storage device 4. The pattern information may include at least one of the size of the pattern, the coverage of the pattern, and the distance between the pattern features.

For example, when the inspection object OB is an original plate for nanoimprint, with respect to the recess pattern and protrusion pattern in the pattern area PR, there is a tendency that the smaller the size of the pattern features, the more difficult the charging, and the larger the size of the pattern features, the easier the charging. The size of the pattern feature in this context may be taken as the mean width in the x/y directions of the recess patterns or the width in the x/y directions of the protrusion patterns. The size of the pattern feature may be taken as the minimum width of the recess patterns or the minimum width of the protrusion patterns. The size of the pattern or pattern features may be taken as the maximum width of the recess pattern or the maximum width of the protrusion patterns.

The inspection device 1 obtains the size of the pattern in the inspection areas DR after the division into the respective inspection areas DR and may determine the pre-irradiation amount for each inspection area DR according to the size of the pattern therein. When the pre-irradiation amount can be set to one of three levels, if the size of the pattern of the inspection area DR is Sth1 or less, the inspection device 1 may set the pre-irradiation amount to be "large". If the size of the pattern of the inspection area DR is Sth1 or greater but less than Sth2 (where Sth2>Sth1), the inspection device 1 may set the pre-irradiation amount to be "medium". If the size of the pattern of the inspection area DR is Sth2 or greater, the inspection device 1 may set that the pre-irradiation amount is "small".

When the inspection object OB is an original plate for nanoimprint, with respect to the recess pattern and the protrusion pattern in the pattern area PR, the charging tends to be difficult in a case of a small coverage of the pattern (e.g., a low pattern coverage ratio), and the charging tends to be easy in case of a large coverage of the pattern (e.g., a high pattern coverage ratio). The coverage of the pattern (a pattern coverage value) may be taken as a ratio of an area of the recess pattern to an area of the inspection area DR, a ratio of an area of the protrusion pattern to the area of the inspection area DR, or a ratio of an area of a boundary portion between the recess pattern and the protrusion pattern with respect to the area of the inspection area DR.

The inspection device 1 may obtain the pattern coverage value of each inspection area DR after the division into different inspection areas DR and may determine the pre-irradiation amount according to the pattern coverage. When the pre-irradiation amount can be set as one of three different levels, if the coverage of the pattern of the inspection area DR is smaller than Cth1, the inspection device 1 may set the pre-irradiation amount to be "large". If the coverage of the pattern of the inspection area DR is Cth1 or greater but less than Cth2 (where Cth2>Cth1), the inspection device 1 may set the pre-irradiation amount to be "medium". If the coverage of the pattern of the inspection area DR is Cth2 or greater, the inspection device 1 may set the pre-irradiation amount to be "small".

When the inspection object OB is an original plate for nanoimprint, with respect to the recess pattern and the protrusion pattern in the pattern area PR, the charging tends to be difficult in case of a short distance between the patterns, and the charging tends to be easy in case of a long distance between the patterns. The distance between the patterns may be taken as the mean distance between the recess patterns, the mean distance between the protrusion patterns, or the mean distance between the boundary portions between the recess pattern and the convex pattern.

The inspection device 1 may obtain the distance between the patterns for each of the divided inspection area DR, and determine the pre-irradiation amount according to the distance between the patterns. When the pre-irradiation amount can be one of three different levels, if the distance between the patterns of the inspection area DR is less than Dth1, the inspection device 1 may set the pre-irradiation amount to be "large". If the distance between the patterns of the inspection area DR is Dth1 or greater but less than Dth2 (where Dth2>Dth1), the inspection device 1 may set the pre-irradiation amount to be "medium". If the distance between the patterns of the inspection area DR is Dth2 or greater, the inspection device 1 may set the pre-irradiation amount to be "small".

The inspection device 1 may adjust the irradiation amount of each inspection area DR according to information about the materials from which the inspection object OB is formed. The inspection objects OB can be formed of materials having different characteristics relevant to the charging characteristics of the inspection object OB. For example, the emission rate of the secondary electrons per primary electron can be taken as value that is K times an emission reference rate of a reference material (for example, glass). In this case, the inspection device 1 may adjust the irradiation amount to be used for each inspection area DR according to Expressions 1 to 3 below.

(Pre-Irradiation Amount of Inspection Area *DR* having Irradiation Amount of "Large")=(Irradiation Amount of "Large")×*K*  Expression 1:

(Pre-Irradiation Amount of Inspection Area *DR* having Irradiation Amount of "Medium")=(Irradiation Amount of "Medium")×*K*  Expression 2:

(Pre-Irradiation Amount of Inspection Area *DR* having Irradiation Amount of "Small")=(Irradiation Amount of "Small")×*K*  Expression 3:

For example, the material information may include information indicating or permitting the calculation of a specific value of K corresponding to the material being inspected. The inspection device 1 may read the material information from the material information storage device 5 and adjust the irradiation amount of each inspection area DR using the Expressions 1 to 3 according to the read material information.

Once the pre-irradiation amount of each inspection area DR is determined, the inspection device 1 generates a pre-irradiation map as illustrated in FIG. 3B and stores the pre-irradiation map in the pre-irradiation map storage device 6. The inspection device 1 irradiates the plurality of inspection areas DR with the plurality of beams MB-1 to MB-n in the pre-irradiation amount in accordance with the pre-irradiation map in the preliminary irradiation.

In FIG. 3B, the pre-irradiation amounts are illustrated in three of levels (large, medium, and small) but the embodiment is not limited thereto. The pre-irradiation map may be generated with the pre-irradiation amounts using larger number of different levels, or the pre-irradiation map may be generated with the pre-irradiation amounts with just two different levels.

The pre-irradiation amount may be adjusted as illustrated in FIGS. 4A to 4F. FIGS. 4A to 4F are diagrams illustrating an adjustment operation for varying the pre-irradiation amount. In the inspection device 1 illustrated in FIG. 1, by the blanking aperture control unit 34, the blanking aperture 14 may freely change the trajectory of the scan and speed of the scan of each beam MB in the inspection area DR.

As illustrated in FIGS. 4A to 4C, the irradiation amount may be adjusted by changing the density of the scan in the raster scan. It is possible to increase the irradiation amount by increasing the density of the scan. FIGS. 4A, 4B, and 4C respectively illustrate cases where the scanning in the y direction is performed in trajectories of 9 rows, 5 rows, and 3 rows along the x direction. FIGS. 4A, 4B, and 4C respectively illustrate large, medium, and small densities of the scanning, and correspond to the large irradiation amount, the medium irradiation amount, and the small irradiation amount of FIG. 3B.

As illustrated in FIGS. 4D to 4F, the irradiation amount may be adjusted by changing the speed of the scan in the raster scan. It is possible to increase the irradiation amount by lowering the raster scan speed or alternatively decrease the irradiation amount by increasing the raster scan speed. FIGS. 4D, 4E, and 4F respectively illustrate lengths of arrows when the scan in the y direction is performed at a high speed, a medium speed, and a low speed. FIGS. 4D, 4E, and 4F respectively illustrate large, medium, and small densities of the scan and correspond to a large irradiation amount, a medium irradiation amount, and a small irradiation amount of FIG. 3B. By combining the adjustments illustrated in FIGS. 4A to 4C and the adjustments illustrated in FIGS. 4D to 4F, the irradiation amount may be adjusted by changing the density and/or the speed of scan in the raster scan.

The performance=of the preliminary irradiation (pre-irradiation) of the pattern area PR, the irradiation for inspection, and image acquisition will now be described. The procedure may be broadly classified into two processes. The first is a performance of scanning in a unit of the inspection stripe area SR illustrated in FIGS. 5A to 5D, and the second is a performance of scanning an upper half area and a lower half area obtained by dividing the inspection stripe areas SR illustrated in FIGS. 6A to 6D into two in the y direction.

FIGS. 5A to 6D are diagrams illustrating operations of the inspection device 1, respectively.

In FIGS. 5A to 5D, the inspection device 1 pre-irradiates one of the inspection stripe areas SR by scanning the irradiation area RR in the first direction and then performs irradiation for inspection and image acquisition on the same inspection stripe area SR while scanning the irradiation area RR in the second direction. The first direction is a direction along the x direction. The second direction is a direction along the x direction opposite to the first direction.

Figure 5A:
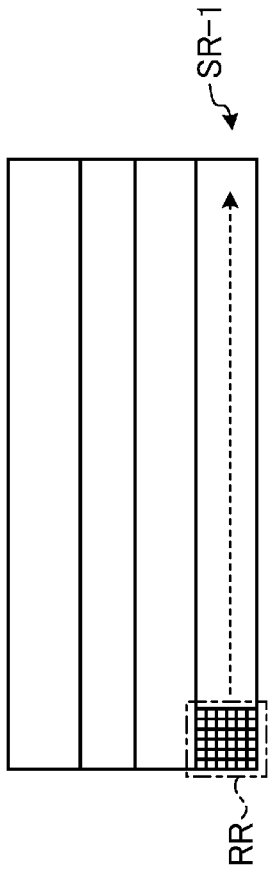
FIGS. 5A to 5D are diagrams illustrating an operation of the inspection device according to the embodiment.

For example, as illustrated in FIG. 5A by a dotted arrow, the inspection device 1 pre-irradiates the inspection stripe area SR-1 by scanning the irradiation area RR from the location of the −x side end in the +x direction. Specifically, the inspection device 1 positions the irradiation area RR on the −x side end in the inspection stripe area SR-1, and pre-irradiates each inspection area DR in the irradiation area RR according to the respective, previously determined pre-irradiation amounts. When the pre-irradiation of the first inspection area DR of the inspection stripe area SR-1 is completed, the inspection device 1 moves the irradiation area RR to the next inspection area DR of the inspection stripe SR-1 adjacent in the +x direction along the inspection stripe area SR-1 and pre-irradiates the next inspection area DR in the irradiation area RR by the respective, previously determined pre-irradiation amounts. The inspection device 1 repeats the pre-irradiation of the irradiation area RR and the movement of the irradiation area RR to the adjacent location in the +x direction as illustrated with the dotted arrow in FIG. 5A.

Figure 5B:
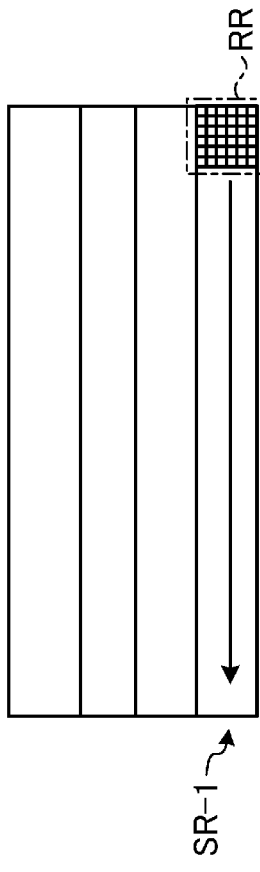

When the pre-irradiation of the inspection stripe area SR-1 is completed, the inspection device 1 performs the irradiation for inspection and the image acquisition by scanning the irradiation area RR in a −x direction as illustrated in FIG. 5B by the solid arrow. Specifically, the inspection device 1 performs irradiation for inspection and image acquisition of each inspection area DR along the inspection stripe SR-1 by movement of the irradiation area RR in the −x direction. For example, in the irradiation for inspection and image acquisition, an equal irradiation amount is used for each inspection area DR. When the irradiation for inspection is completed for the inspection stripe SR-1, the inspection device 1 moves to the next inspection stripe SR-2

That is, the inspection device 1 moves the irradiation area RR in the +y direction and locates the irradiation area RR at the −x side end of the inspection stripe area SR-2.

Figure 5C:
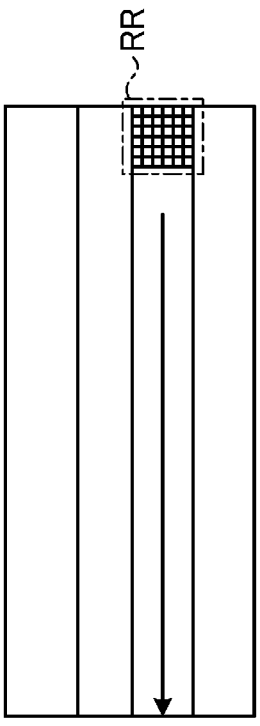

As illustrated in FIG. 5C with the dotted arrow, the inspection device 1 pre-irradiates the inspection stripe area SR-2 while scanning the irradiation area RR from the −x side end in the +x direction.

Figure 5D:
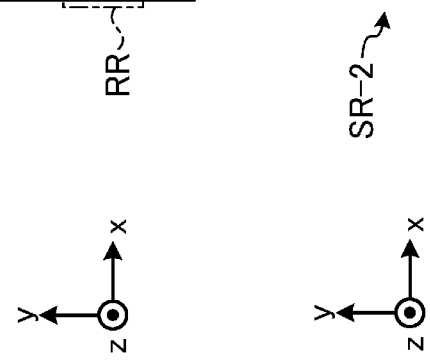

When the pre-irradiation of the inspection stripe area SR-2 is completed, the inspection device 1 performs the irradiation for inspection and the image acquisition while scanning the irradiation area RR along the inspection stripe area SR-2 in the −x direction as illustrated in FIG. 5D by the solid arrow.

In FIGS. 6A to 6D, the inspection stripe areas SR are divided into upper and lower halves (divided at midpoint along the y direction into halves). A half stripe area SRU in the upper half (+y side) and a half stripe area SRL in the lower half (−y side) is thus defined. A half area of the irradiation area RR in the upper half is labeled as RRU, and a half area of the irradiation area RR in the lower half is labeled as RRL. The inspection device 1 performs the pre-irradiation while scanning the half area RRU in the half stripe area SRU in the first direction and also performs the irradiation for inspection and the image acquisition while scanning the half area RRL in the half stripe area SRL in the first direction. The inspection device 1 moves the half area RRL in the +y direction by a distance equivalent to the y direction width of the half stripe area. The inspection device 1 performs the pre-irradiation while scanning the half area RRU in the half stripe area SRL in the second direction and performs the irradiation for inspection and the image acquisition while scanning the half area RRL in the half stripe area SRU in the second direction.

Figure 6A:
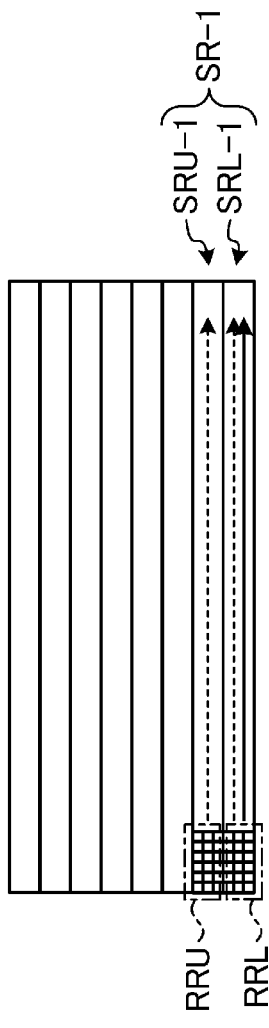
FIGS. 6A to 6D are diagrams illustrating an operation of the inspection device according to the embodiment.

For example, as illustrated in FIG. 6A with a dotted arrow, the inspection device 1 performs the pre-irradiation while scanning the half area RRU in a half stripe area SRU-1 from the −x side end towards the +x direction. Together with this, the inspection device 1 also performs the pre-irradiation, the irradiation for inspection, and image acquisition while scanning the half area RRL in a half stripe area SRL-1 from the −x side end in the +x direction as illustrated in FIG. 6A with the dotted arrow (pre-irradiation) and the solid arrow (irradiation for inspection and image acquisition).

When the pre-irradiation of the half stripe area SRU-1 and the image acquisition of the half stripe area SRL-1 is completed, the inspection device 1 moves the half area RRU in the +y direction to be located at the +x side end of a half stripe area SRL-2 and moves the half area RRL in the +y direction to be located at the +x side end of the half stripe area SRU-1.

Figure 6B:
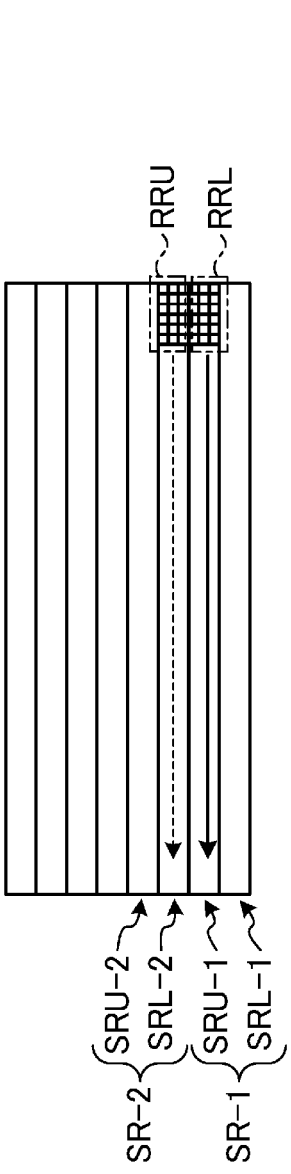

As illustrated in FIG. 6B with the dotted arrow, the inspection device 1 performs the pre-irradiation while scanning the half area RRU in the half stripe area SRL-2 from the +x side end towards the −x direction. Together with this, as illustrated in FIG. 6B by the solid arrow, the inspection device 1 performs the irradiation for inspection and the image acquisition while scanning the half area RRL in the half stripe area SRU-1 from the +x side end towards the −x direction.

When the pre-irradiation at the location of the −x side end of the half stripe area SRL-2 is completed, and the image acquisition at the location of the −x side end of the half stripe area SRU-1 is completed, the inspection device 1 moves the half area RRU in the +y direction to be located at the −x side end of a half stripe area SRU-2, and moves the half area RRL in the +y direction to be located at the −x side end of the half stripe area SRL-2.

Figure 6C:
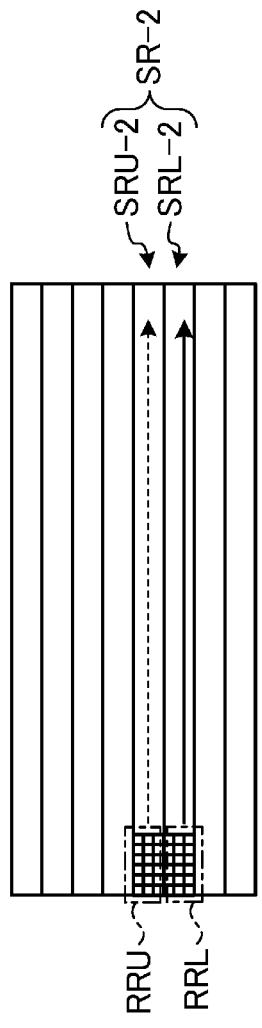

As illustrated in FIG. 6C by the dotted arrow, the inspection device 1 performs the pre-irradiation while scanning the half area RRU in the half stripe area SRU-2 from the −x side end towards the +x direction. Together with this, as illustrated with the solid arrow in FIG. 6C, the inspection device 1 performs the irradiation for inspection and the image acquisition while scanning the half area RRL in the half stripe area SRL-2 from the −x side end towards the +x direction.

When the pre-irradiation at the location of the +x side end of the half stripe area SRU-2 is completed, and the image acquisition at the location of the +x side end of the half stripe area SRL-2 is completed, the inspection device 1 moves the half area RRU in the +y direction to be located at the +x side end of a half stripe area SRL-3 and moves the half area RRL in the +y direction to be located at the +x side end of the half stripe area SRU-2.

Figure 6D:
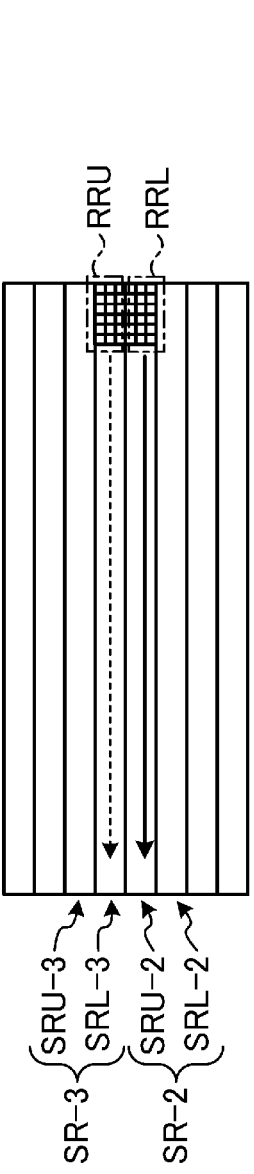

As illustrated in FIG. 6D by the dotted arrow, the inspection device 1 performs pre-irradiation while scanning the half area RRU in the half stripe area SRL-3 from the +x side end towards the −x direction. Together with this, as illustrated in FIG. 6D by the solid arrow, the inspection device 1 performs the irradiation for inspection and the image acquisition while scanning the half area RRL in the half stripe area SRU-2 from the +x side end towards the −x direction.

A flow of an operation of the inspection device 1 is described by using FIG. 7. FIG. 7 is a flowchart illustrating an operation of the inspection device 1. FIG. 7 illustrates an example of a procedure of a multi-beam inspection method.

The inspection device 1 reads design data of the pattern area PR from the pattern information storage device 4 into the control computer 3 (S1). The design data may be secondary design data (for example, layout design data). The inspection device 1 reads material information of the inspection object OB from the material information storage device 5 into the control computer 3 (S2). The inspection device 1 generates a pre-irradiation map of the plurality of inspection areas DR based on design data and the material information (S3) and stores the pre-irradiation map in the pre-irradiation map storage device 6.

For example, the inspection device 1 divides the design data of the pattern area PR into design data of the plurality of inspection stripe areas SR and divides the design data of each inspection stripe area SR into the design data of the irradiation areas RR at a plurality of locations. The inspection device 1 divides the design data of the irradiation area RR at each location into the design data of the plurality of inspection areas DR. The inspection device 1 obtains the pattern information of the plurality of inspection areas DR based on the design data of the plurality of inspection areas DR. The pattern information may include at least one of the size of the pattern, the coverage of the pattern, and the distance between the patterns. The inspection device 1 respectively obtains the irradiation amounts of the plurality of beams MB corresponding to the plurality of inspection areas based on the pattern information of the plurality of inspection areas DR. The inspection device 1 may adjust an irradiation amount of each inspection area DR according to the material information of the inspection object OB. The inspection device 1 generates the pre-irradiation map of the plurality of inspection areas DR according to the irradiation amount of each inspection area DR.

When the pre-irradiation is to be performed, the inspection device 1 reads the pre-irradiation map from the pre-irradiation map storage device 6. The inspection device 1 determines the performance procedure of the pre-irradiation, the irradiation for inspection, and the image acquisition in the pattern area PR based on the pre-irradiation map (S4). For example, the inspection device 1 may determine the performance procedure of the pre-irradiation, the irradiation for inspection, and the image acquisition in the pattern area PR to be the procedure illustrated in FIGS. 5A to 5D or to be the procedure illustrated in FIGS. 6A to 6D. The inspection device 1 then performs the pre-irradiation, the irradiation for inspection, and the image acquisition of the plurality of inspection areas DR according to the selected procedure (S5). At this point, paying attention to the irradiation areas RR at the same location, the inspection device 1 preliminarily irradiates the plurality of inspection areas DR with the plurality of beams MB at the irradiation amounts respectively obtained. The inspection device 1 irradiates the plurality of inspection areas DR with the plurality of beams MB while performing the preliminary irradiation (pre-irradiation). The inspection device 1 generates images of the plurality of inspection areas DR irradiated with the plurality of beams MB.

The inspection device 1 performs the inspection (S6). For example, the inspection device 1 may generate an overall image obtained by synthesizing an image from each inspection areas DR acquired in S5 and perform inspection by using the overall image thus obtained. Otherwise, the inspection device 1 may generate a stripe image obtained by synthesizing the image of each inspection area DR acquired in S5 on an inspection stripe areas SR (see FIGS. 5A to 5D) basis and perform the inspection on an inspection stripe area SR basis by using the stripe images thus obtained. Otherwise, the inspection device 1 may generate an irradiation area image obtained by synthesizing the image of each inspection area DR acquired in S5 with respect to the irradiation area RR of each location (see FIGS. 5A to 6D) and perform inspection on an irradiation area RR basis for each location by using the irradiation area image thus obtained. In some instances, when defects or particles are detected by the inspection process, a pattern correction process or a cleaning step may be performed on the inspection object OB. As a result, the original plate or device substrate may be appropriately manufactured even after an initially failed inspection or the like.

As above, according to an embodiment, the inspection device 1 obtains respective preliminary irradiation amounts corresponding to the plurality of inspection areas based on the pattern information of the plurality of inspection areas. The inspection device 1 preliminarily irradiates the plurality of inspection areas in the inspection object OB with the beams MB in the obtained irradiation amounts, respectively. Thereafter, the inspection device 1 irradiates the plurality of inspection areas with the plurality of beams MB-1 to MB-n for inspection in the state in which the preliminary irradiation is performed. Accordingly, irradiation with primary electrons can be performed by the beam irradiation for inspection in the state in which the emission rate of the secondary electrons to the primary electrons in the plurality of inspection areas is equalized by the preliminary beam irradiation. As a result, the front surface state of the inspection object can be more appropriately reflected to the emission rate of the secondary electrons for inspection, the fluctuations of the brightness or the contrast per inspection image can be prevented, the inspection accuracy by the inspection device 1 can be improved.

Figure 8:
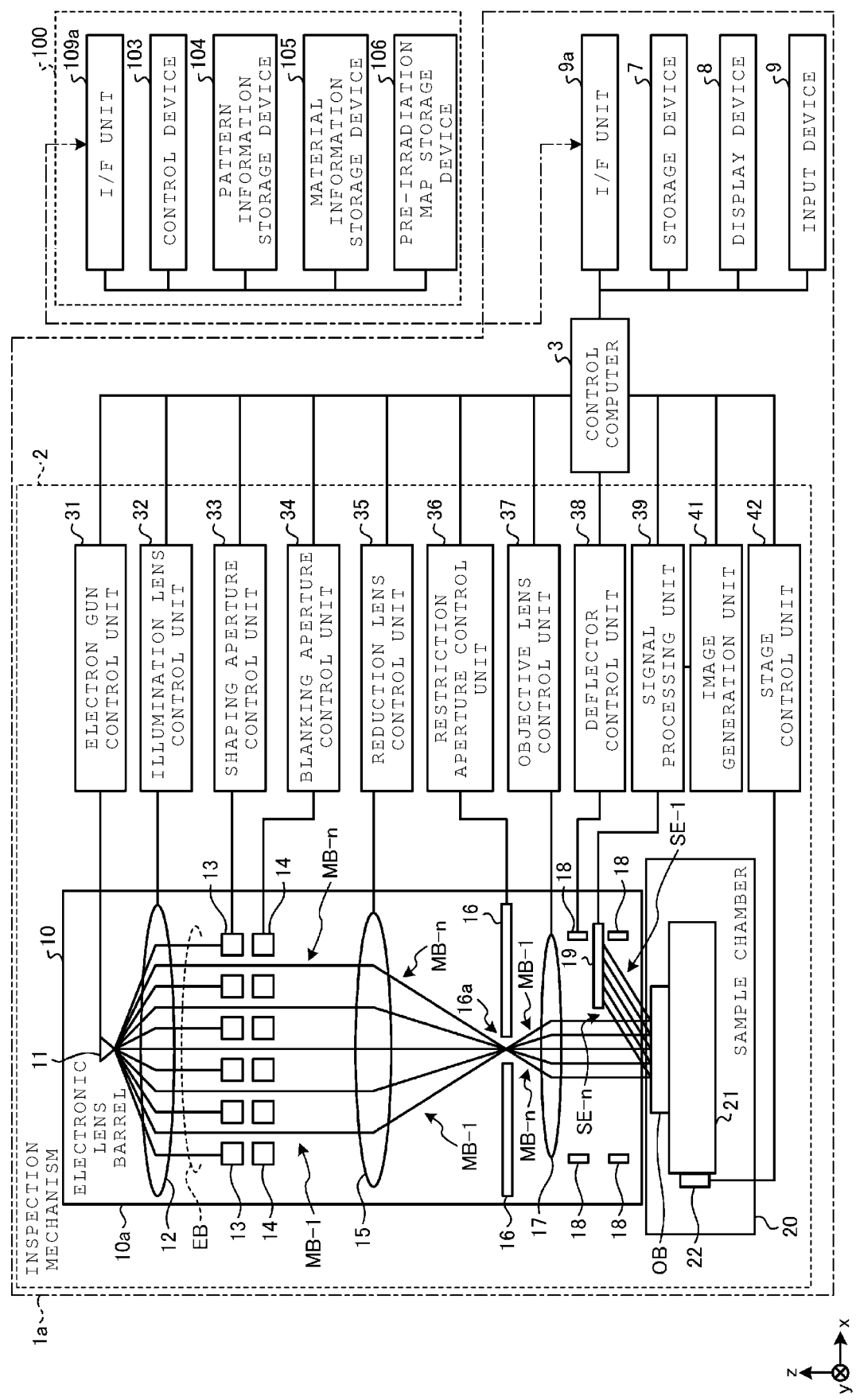
FIG. 8 is a diagram illustrating a configuration of an inspection device according to a modification of the embodiment.

As illustrated in FIG. 8, an inspection device 1a of another example may acquire the pre-irradiation map from an external pre-irradiation map generation system 100 without itself generating the pre-irradiation map. FIG. 8 is a diagram illustrating the configuration of an inspection device 1a according to a modification of the inspection device 1.

The pattern information storage device 4, the material information storage device 5, and the pre-irradiation map storage device 6 (see FIG. 1) can be omitted from the inspection device 1a, but an interface (I/F) unit 9a is included therein. The pre-irradiation map generation system 100 includes a control device 103, a pattern information storage device 104, a material information storage device 105, a pre-irradiation map storage device 106, and an interface (I/F) unit 109a. The pre-irradiation map generation system 100 may be implemented, for example, by a computer.

For example, when the I/F unit 9a and the I/F unit 109a are connected to each other via a communication line, the inspection device 1a transmits a pre-irradiation map production request from the I/F unit 9a to the pre-irradiation map generation system 100 via the communication line. In the pre-irradiation map generation system 100, when the pre-irradiation map production request is received by the I/F unit 109a, the control device 103 reads the design data from the pattern information storage device 104 and reads the material information of the inspection object OB from the material information storage device 105 to the control computer 3. The control device 103 generates the pre-irradiation map of the plurality of inspection areas DR and stores the pre-irradiation map in the pre-irradiation map storage device 106 based on the read design data and the read material information.

To perform the pre-irradiation, the inspection device 1a transmits a pre-irradiation map acquisition request via the I/F unit 9a to the pre-irradiation map generation system 100 on the communication line. In the pre-irradiation map generation system 100, when the pre-irradiation map acquisition request is received by the I/F unit 109a, the control device 103 reads the pre-irradiation map from the pre-irradiation map storage device 106 and transmits the pre-irradiation map from the I/F unit 109a to the inspection device 1a via the communication line. After the pre-irradiation map is received by the I/F unit 9a, the inspection device 1a performs the processes of S5 and S6 of FIG. 7.

Otherwise, when the I/F unit 9a and the I/F unit 109a are not connected to each other via the communication line, the pre-irradiation map production request may be input to the pre-irradiation map generation system 100 via the I/F unit 109a. When the pre-irradiation map production request is input, the control device 103 reads the design data from the pattern information storage device 104 and reads the material information of the inspection object OB from the material information storage device 105 to the control computer 3. The control device 103 generates the pre-irradiation map of the plurality of inspection areas DR and stores the pre-irradiation map in the pre-irradiation map storage device 106 based on the read design data and the read material information.

To perform the pre-irradiation, the inspection device 1a sends or outputs information such as a message indicating that the pre-irradiation is to be performed by displaying the information on the display device 8. According to this notification, an external storage medium may be connected to the pre-irradiation map generation system 100 via the I/F unit 109a, and also the pre-irradiation map acquisition request may be input to the pre-irradiation map generation system 100 via the I/F unit 109a. When the pre-irradiation map acquisition request is received, the control device 103 reads the pre-irradiation map from the pre-irradiation map storage device 106 and stores the pre-irradiation map in the external storage medium via the I/F unit 109a. According to this, the external storage medium is connected to the inspection device 1a via the I/F unit 9a, and the pre-irradiation map is sent from the external storage medium to the inspection device 1a via the I/F unit 9a. After the pre-irradiation map is received via the I/F unit 9a, the inspection device 1a performs the processes of S5 and S6 of FIG. 7.

In this manner, the inspection device 1a does not generate the pre-irradiation map but rather acquires the pre-irradiation map from the external pre-irradiation map generation system 100, and accordingly, the pattern information storage device 4, the material information storage device 5, and the pre-irradiation map storage device 6 may be omitted. Therefore, the configuration of the inspection device 1a can be simplified, and the cost of the inspection device 1a can be reduced.

Description has been given concerning examples in which an original plate for nanoimprint (also referred to as a nanoimprint template, an imprint mold, or the like) is the inspection object OB, but the present disclosure can be applied also to the inspection of an EUV (extreme ultraviolet) photomask or inspection of a device substrate. In this case, a positively charged initial state in which the inspection image becomes bright is not always the best condition for inspection purposes, and thus a changeover point to negative charging for which the inspection image becomes dark can be used in setting the pre-inspection charging state. That is, the pre-irradiation may be performed so that charging is weaker.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An inspection device, comprising:
   a control unit configured to acquire pre-charging irradiation amounts for a plurality of inspection areas on an inspection target, the pre-charging irradiation amounts being based on pattern information for each of the plurality of inspection areas;
   an irradiation unit configured to:
      control a plurality of first beams to supply the pre-charging irradiation amounts for each of the plurality of inspection areas at a same time using a corresponding one of the plurality of first beams, respectively, and
      irradiate the at least one of the plurality of inspection areas with one of a plurality of second beams after supplying the respective pre-charging irradiation amount to at least one of the plurality of inspection areas; and
   a generation unit configured to generate images of each of the plurality of inspection areas based on the irradiation of the plurality of inspection areas with the plurality of second beams.

2. The inspection device according to claim 1, wherein the control unit detects a defect of the inspection object from the generated images of the plurality of inspection areas.

3. The inspection device according to claim 1, wherein the pattern information is at least one of a pattern feature dimension, a coverage ratio of the pattern, or a distance between adjacent pattern features.

4. The inspection device according to claim 1, wherein the irradiation unit includes:
   a particle beam generation unit configured to generate a charged particle beam,
   a beam divider configured to split the generated charged particle beam into the plurality of first beams to be supplied to the inspection target at the same time and the plurality of second beams to be supplied to the inspection target at the same time, and
   a dose adjustment unit configured to adjust the respective irradiation amounts provided by the plurality of first beams and the plurality of second beams for each of the plurality of inspection areas.

5. The inspection device according to claim 4, wherein the charged particle beam is an electron beam.

6. The inspection device according to claim 4, wherein the dose adjustment unit adjusts the respective irradiation amounts provided by the plurality of first beams by adjusting a raster scanning speed of each first beam within a corresponding one of the plurality of inspection areas.

7. The inspection device according to claim 4, wherein the dose adjustment unit adjusts the respective irradiation amounts provided by the plurality of first beams by adjusting a raster scanning density of each first beam within a corresponding one of the plurality of inspection areas.

8. The inspection device according to claim 1, wherein the control unit acquires the pre-charging irradiation amounts for the plurality of inspection areas by calculating the pre-charging irradiation amounts based on design data for a pattern formed on the inspection target, the design data providing the pattern information.

9. The inspection device according to claim 8, wherein the pre-charging irradiation amounts are further calculated based on material characteristics of the inspection target.

10. An inspection method, comprising:
   acquiring pattern information for a plurality of inspection areas on an inspection target;
   calculating pre-charging irradiation amounts for the plurality of inspection areas based on the pattern information;
   controlling a plurality of first beams to supply the calculated pre-charging irradiation amounts for each of the plurality of inspection areas at the same time using a corresponding one of the plurality of first beams, respectively;
   after supplying the calculated pre-charging irradiation amount to at least one of the plurality of inspection areas, irradiating at least one of the plurality of inspection areas with one of a plurality of second beams after the pre-charging irradiation; and
   generating images of each of the plurality of inspection areas based on the irradiation of the plurality of inspection areas with the plurality of second beams.

11. The inspection method according to claim 10, further comprising:
   detecting a defect of the inspection object from the generated images of the plurality of inspection areas.

12. The inspection method according to claim 10, wherein the pattern information is at least one of a pattern feature dimension, a coverage ratio of the pattern, or a distance between adjacent pattern features.

13. The inspection method according to claim 10, wherein pre-charging irradiation amounts for each of the plurality of inspection areas are adjusted by changing a raster scanning speed of a corresponding one of the plurality of first beams.

14. The inspection method according to claim 10, wherein pre-charging irradiation amounts for each of the plurality of inspection areas are adjusted by changing a raster scanning density of a corresponding one of the plurality of first beams.

15. The inspection method according to claim 10, wherein the pattern information is provided as design data for a pattern formed on the inspection target.

16. The inspection method according to claim 10, wherein the inspection target is an original plate for imprint lithography or photolithography.

17. The inspection method according to claim 10, wherein the inspection target is a semiconductor device substrate.

18. An inspection method, comprising:
   acquiring design data of a pattern formed on an inspection target;
   acquiring material characteristics information for the inspection target;
   generating a pre-irradiation map based on the acquired design data and material characteristic information, the pre-irradiation map indicating a pre-charging irradiation amount for each of a plurality of inspection areas on the inspection target;
   performing a pre-charging irradiation on the plurality of inspection areas according to the pre-irradiation map using a respective first beam from a plurality of first beams for each of the plurality of inspection areas, the pre-charging irradiation being performed at the same time for each of the plurality of inspection areas using the plurality of first beams;
   irradiating each of the plurality of inspection areas to acquire image data from each of the plurality of inspection areas; and
   generating an image of the inspection target from the acquired image data from the plurality of inspection areas.

19. The inspection method according to claim 18, further comprising:
   evaluating the inspection target for defects using the generated image.

20. The inspection method according to claim 18, wherein the inspection target is one of an original plate or a semiconductor device substrate.

* * * * *